June 19, 1934.   J. E. SMITH   1,963,924
ELECTRIC TOASTER
Filed March 5, 1932   2 Sheets-Sheet 1
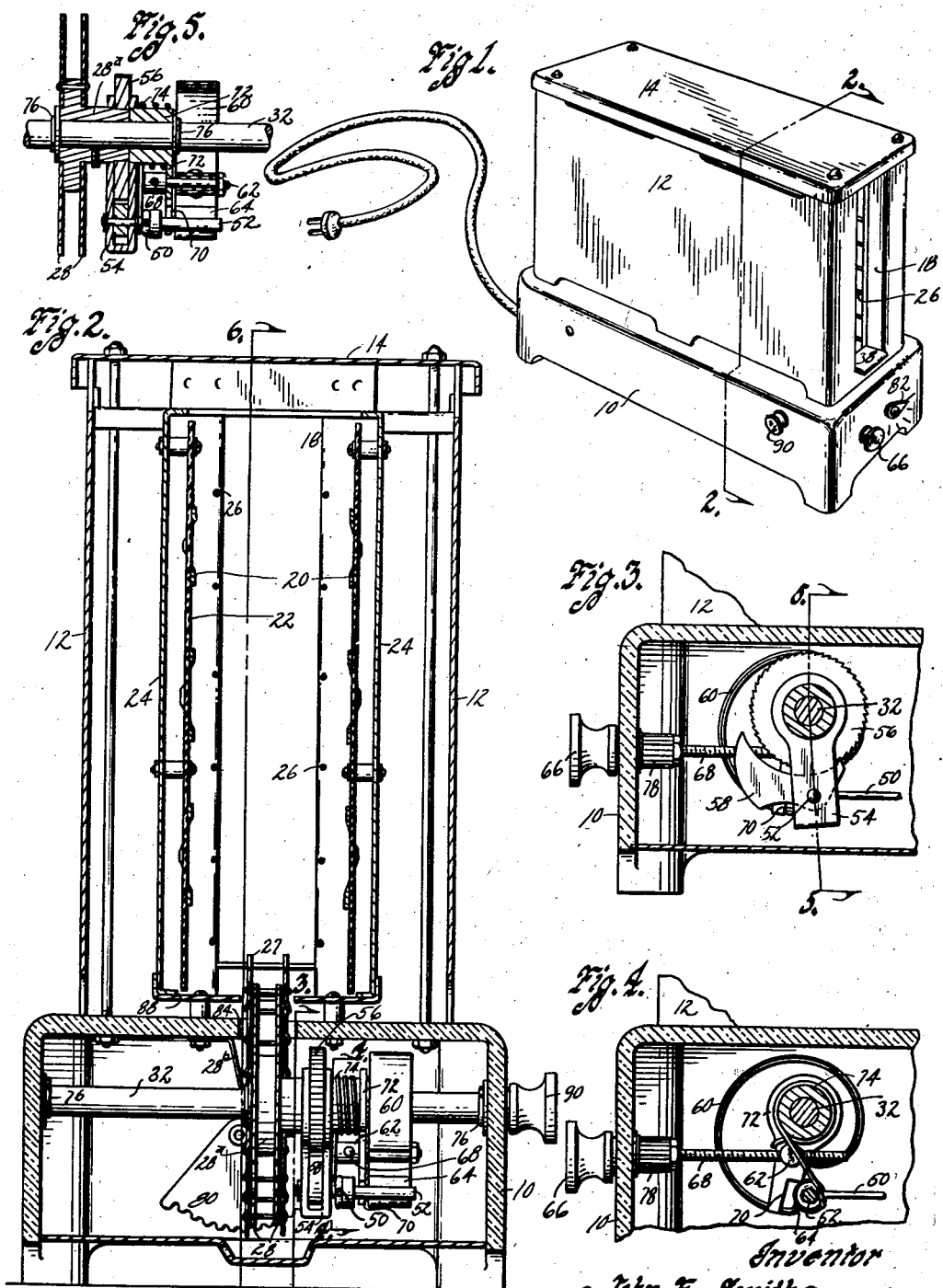

June 19, 1934.   J. E. SMITH   1,963,924
ELECTRIC TOASTER
Filed March 5, 1932   2 Sheets-Sheet 2
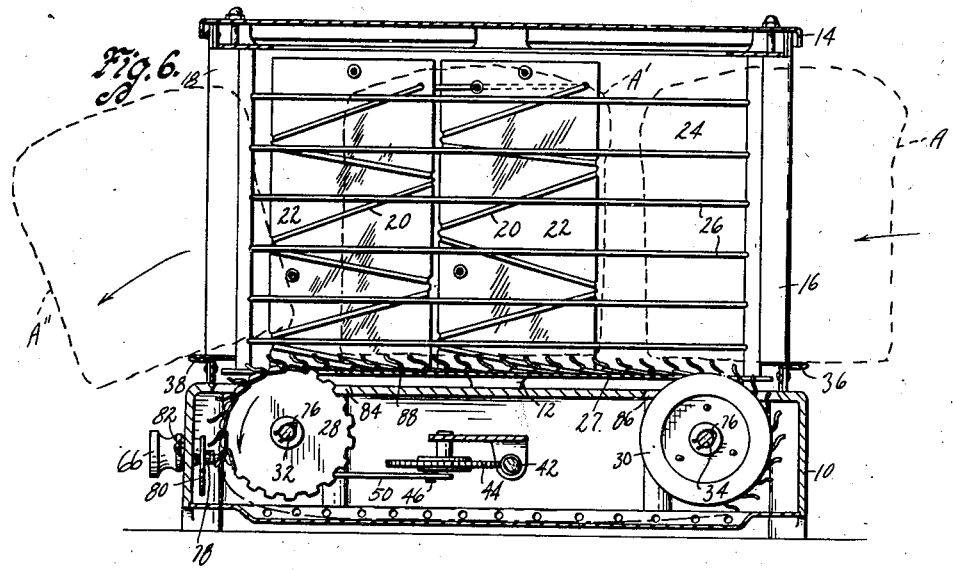
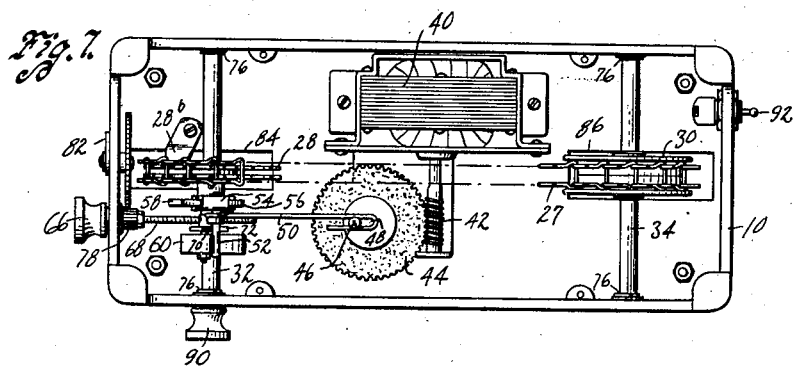
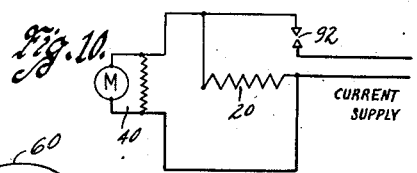
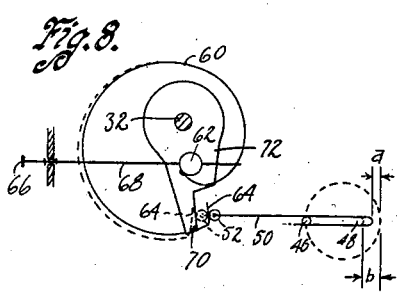
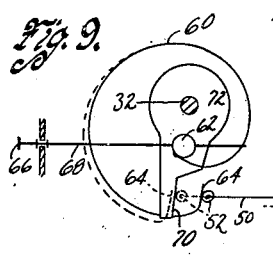

Patented June 19, 1934

1,963,924

UNITED STATES PATENT OFFICE 1,963,924

ELECTRIC TOASTER

John E. Smith, Belleville, Ill., assignor to Knapp-Monarch Company, Belleville, Ill., a corporation of Missouri Application March 5, 1932, Serial No. 597,077

10 Claims. (Cl. 53—5)

An object of my present invention is to provide an electric toaster with electric motor means for advancing bread therethrough and timing its period of passage through the toaster, the mechanism of the toaster being comparatively simple and inexpensive from a manufacturing standpoint.

A further object is to provide a toaster having an electric motor operated means for advancing bread past the heating elements of the toaster, with means for adjusting the speed of such advance so as to obtain light, medium or brown toast as desired.

A further object is to provide ratchet means for advancing the bread, the ratchet means being operated by an electric motor and being manually adjustable to time the conveyance of the bread through the toaster, as desired.

A further object is to provide means for automatically reducing the speed of the conveyor mechanism for the bread while the toaster is in cool condition and speeding up the advance of the bread in proportion to the temperature rise of the toaster.

Still a further object is to provide the automatic means in the form of a thermostatic mechanism which normally reduces the speed of the bread conveyor, but upon becoming heated allows the speed thereof to increase in proportion to the heat of the toaster as imparted by radiation and conduction to the thermostatic mechanism.

Still another object is to provide conveyor mechanism movable longitudinally between heating elements arranged within a casing, the heating elements being closer to the discharge end of the casing than to the intake end so that a warming compartment is provided within the casing for the bread before it actually comes into registry with the heating elements.

With these and other objects in view my invention consists in the construction, arrangement and combination of the various parts of my electric toaster, whereby the objects contemplated are attained, as hereinafter more fully set forth, pointed out in my claims, and illustrated in the accompanying drawings, in which:

Figure 1 is a perspective view of an electric toaster embodying my invention.

Figure 2 is an enlarged sectional view on the line 2—2 of Figure 1.

Figure 3 is a sectional view on the line 3—3 of Figure 2 showing a ratchet mechanism.

Figure 4 is a sectional view on the line 4—4 of Figure 2 showing a thermostatic mechanism.

Figure 5 is a sectional view on the line 5—5 of Figure 3.

Figure 6 is a longitudinal sectional view through the toaster as taken on the line 6—6 of Figure 2.

Figure 7 is a bottom plan view.

Figures 8 and 9 are diagrammatic views of the adjustment mechanism of the toaster; and Figure 10 is a wiring diagram.

On the accompanying drawings, I have used the reference numeral 10 to indicate a base. The base 10 is preferably formed of insulating material and is hollowed out underneath, as clearly shown in Figure 2. On the base 10 is mounted a casing 12 having a top 14 and having intake and discharge openings 16 and 18, respectively, at its ends.

Within the casing 12 I provide heating elements 20 supported on plates 22 of mica or the like, which in turn are supported on metal plates 24. Grid wires 26 are arranged between the heating elements 20 and are adapted to hold slices of bread from contact with the heating elements in the ordinary manner.

Referring to Figure 6, it will be noted that the heating elements 20 are located closer to the discharge opening 18 than they are to the intake opening 16 and the purpose of this construction will hereinafter be set forth.

I provide a means for conveying or advancing slices of bread A from the intake opening 16, past the heating elements 20 and out of the discharge opening 18. Such a bread support or conveyor may be of any desired movable form and on the drawings, I have shown a conveyor chain 27 for this purpose. The chain 27 extends around a sprocket 28 and around an idler roller 30, which are mounted on shafts 32 and 34, respectively. The sprocket 28 is secured to the shaft 32 and it will therefore be obvious that rotation of the shaft will cause movement of the conveyor chain 27.

The conveyor chain is provided with prongs, so as to effectively engage the lower edge of the slices of bread for the purpose of advancing them. Intake and discharge platforms 36 and 38, respectively (see Figure 6) serve in conjunction with the chain 27 as guides for the bread as it is advanced through the casing 12.

For rotating the sprocket 28 and accordingly imparting movement to the conveyor chain 27, I provide an electric motor 40 and the following associated mechanism. The motor 40 is provided with a worm 42 on its shaft which imparts rotation to a worm gear 44. The worm gear 44 has a crank pin 46 arranged in a slot 48 at one end of a link 50.

The other end of the link 50 is pivoted to a pin 52 carried by an arm 54. The arm 54 straddles a ratchet wheel 56 which is secured to the hub 28ᵃ of the sprocket wheel 28. Pivoted on the pin 52 is a pawl 58 for engaging the teeth of the ratchet wheel 56 and thereby rotating it whenever the link 50 is oscillated in one direction.

A temperature responsive bar of bimetallic construction is indicated at 60. One end thereof is anchored to a pin 62 in any desired manner. The other end thereof indicated at 64 constitutes a thermostatic stop for the pin 52. The position of the stop 64 can be adjusted by rotating a knob 66 and a screw 68. The screw 68 is rotatable but non-slidable relative to the casing 10 and is screw threaded through the pin 62 or more specifically an enlarged head thereof as shown in Figure 5. It will therefore be obvious that rotation of the screw 68 will move the pin 62 longitudinally thereof and thus adjust the distance between the thermostatic stop 64 and the worm gear 44.

Besides the thermostatic stop 64, I provide a positive manual stop 70 which is one edge of a lever 72. The lever 72 is oscillatable on the shaft 32 and the pin 62 extends therethrough so that adjustment of the pin swings the arm 72. A spring 74 is provided on the arm 72 for constraining the pin 52 toward the thermostatic and manual stops 64 and 70 and thus returning the pawl 58 during each cycle of operation thereof.

The shafts 32 and 34 are provided with keys 76 to prevent their longitudinal movement relative to the base 10 and to prevent longitudinal movement of the parts 28ᵃ and 72 relative to the shaft 32. In connection with the knob 66 and the threaded shaft 68, I provide a pinion 78 meshing with a gear sector 80. The gear sector 80 is connected with a pointer 82 whereby the adjustment of the pin 62 is indicated and suitable indicating characters can be marked on the base 10 for "light", "medium" and "brown" toast, for instance.

The base 10 is provided with slots 84 and 86 for the sprocket 28 and the roller 30, respectively. Above the base 10, a supporting plate 88 is provided for the upper stretch of the conveyor chain 27. The shaft 32 is provided with a knob 90 whereby the conveyor chain 27 may be manually operated independent of the operation thereof as caused by energization of the motor 40. On the base 10, I provide a switch 92 for switching on the heating elements 20 and the motor 40. In Figure 10, the circuit is shown. It will be obvious that the heating elements and the motor being controlled by the one switch are energized and denergized simultaneously.

To prevent reverse rotation of the sprocket wheel 28 when the pawl 58 is moved toward the left in Figure 3, I provide a friction spring 28ᵇ (see Figures 2 and 7).

Practical operation

In the operation of my electric toaster, the switch 92 is moved to closed position whereupon the heating elements 20 will start to heat and the conveyor chain 27 will start moving because of the motor 40 being energized. With the knob 66 adjusted as shown in Figure 8, the link 50 will travel the distance indicated at $a$ each revolution of the worm gear 44. This distance is slight so that the arm 54 will not be oscillated very far and consequently the pawl 58 will not advance the ratchet wheel 56 very far per cycle of operation of the pawl.

The bread A, as indicated at the right of Figure 6, rests on the intake platform 36 and the conveyor chain 27 and is thereby advanced toward and then between and past the heating elements 20. In the position shown, the bread is partially in a warming compartment instead of registering with the heating elements. As the bread is advanced, it will assume the position A' and become toasted and will finally assume the position A" after being supported on the discharge platform 38 and the conveyor chain 27 until it overbalances. It will then drop out of the toaster.

Since the distance $a$ (see Figure 8) is quite small, it will be obvious that the bread will be advanced slowly. However, as the heating elements 20 become hotter and radiate their heat to the toaster and through the opening 84, the thermostatic element 60 will gradually warp to the dotted line position of Figure 8, thus lengthening the stroke, as indicated at $b$.

The chain 27, the sprocket 28, the hub 28ᵃ, the arm 72 and the pin 62 will also serve to conduct heat to the element 60 to cause its warping to the dotted line position. When it does reach the dotted line position, then the edge 70 of the arm 72 will act as a positive stop so as to predetermine the maximum travel of the link 50 and accordingly the maximum speed of the chain 27 for the adjustment illustrated. Thereafter, the element 60 can warp still farther without affecting the positive adjustment.

When the parts are adjusted as in Figure 9, however, the initial travel of the chain 27 is faster because the dimension $a'$ is greater. After the thermostatic element 60, however, has warped to the dotted line position shown in this figure, the travel of the link 50 is still greater, it being indicated by the dimension $b'$. With this adjustment, the chain travels faster during a given period of time and consequently the bread is not in the toaster as long and is not as brown as with the adjustment shown in Figure 8.

By comparing Figure 8 with Figure 9, it will be noted that the adjustment of the thermostatic stop 64 is in different proportion than the adjustment of the edge 70 of the lever 72. This is in order to keep the dimensions $a$ and $b$ somewhat in proportion with the dimensions $a'$ and $b'$ so that at all positions of adjustment the comparative toasting of the bread will be the same when the toaster is fully heated as when it is just starting to heat.

The proportional difference just referred to is secured by the thermostatic stop 64 being moved the same distance as the pin 62 when it is adjusted by reason of the stop 64 being secured thereto and the pin 62 being held non-rotatable by, and relative to the shaft 68, but the stop edge 70 of the lever 72 traveling farther because of being a greater distance from the axis of the shaft 32 than the pin 62, which is pivoted to the lever.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a toaster, a heating element, a bread support thereadjacent, power operated ratchet and pawl means for imparting movement to said bread support to cause conveyance of bread past said heating element at a predetermined speed by the pawl picking up a predetermined number of ratchet teeth each cycle of operation and means responsive to temperature conditions of the toaster to decrease the number of ratchet teeth picked up by said pawl each cycle of operation until said toaster is thoroughly heated whereupon said predetermined number of ratchet teeth are picked up.

2. In a bread toaster, a heating element, a bread support normally thereadjacent and movable to a position spaced relative thereto to terminate the toasting operation on bread carried thereby, timing means for so moving said bread support and including a ratchet and a pawl adapted to pick up a variable number of the teeth on said ratchet when said pawl operates through one cycle and thermal responsive means to adjust the number so picked up.

3. In a bread toaster, a heating element, a bread support normally thereadjacent and movable to a position spaced relative thereto to terminate the toasting operation on bread carried thereby, timing means for so moving said bread support and including a ratchet and a pawl adapted to pick up a variable number of the teeth on said ratchet when said pawl operates through one cycle, manual means for adjusting the number of teeth so picked up and thermal responsive means for automatically decreasing said number till the toaster has heated up.

4. In a bread toaster, a heating element, a bread support normally thereadjacent and movable to a position spaced relative thereto to terminate the toasting operation on bread carried thereby, timing means for so moving said bread support and including a ratchet and a pawl adapted to pick up a variable number of the teeth on said ratchet when said pawl operates through one cycle, thermal responsive means for automatically decreasing the number of teeth so picked up until said toaster heats up and manual means to adjust such number and also the position of said thermal responsive means.

5. In a bread toaster, a heating element, a bread support normally thereadjacent and movable to a position spaced relative thereto to terminate the toasting operation on bread carried thereby, timing means for so moving said bread support and including a ratchet and a pawl adapted to pick up a variable number of the teeth on said ratchet when said pawl operates through one cycle, thermal responsive means for automatically decreasing the number of teeth so picked up until said toaster heats up and manual means to adjust such number and also the position of said thermal responsive means but in less degree.

6. In a device of the class described, an actuating element and means to adjust the stroke thereof comprising a manually adjustable stop and a thermal responsive element, said thermal responsive element being effective as a stop till a predetermined degree of heat is attained by said device and the manually adjustable stop then being effective.

7. In a device of the class described, an actuating element and means to adjust the stroke thereof comprising a manually adjustable stop and a thermal responsive element, said thermal responsive element being effective as a stop till a predetermined degree of heat is attained by said device and the manually adjustable stop then being effective, said manually adjustable stop being associated with the thermal responsive element to adjust it when the manually adjustable stop is adjusted.

8. In a device of the class described, an actuating element and means to adjust the stroke thereof comprising a manually adjustable stop and a thermal responsive element, said thermal responsive element being effective as a stop till a predetermined degree of heat is attained by said device and the manually adjustable stop then being effective, said manually adjustable stop being associated with the thermal responsive element to adjust it when the manually adjustable stop is adjusted, the degree of adjustment of the thermal responsive element being less than the degree of adjustment of the manually adjustable stop.

9. A device of the class described comprising an actuating element and means to adjust the stroke thereof comprising a manually adjustable stop lever and a thermal responsive element, said thermal responsive element being effective as a stop till a predetermined degree of heat is attained by said device and the manually adjustable stop lever then being effective, the manually adjustable stop lever being associated at a point closer to its axis of movement than the stop portion thereof with said thermal responsive element to adjust it when the manually adjustable stop lever is adjusted.

10. In a device of the class described, an actuating element and means to adjust the stroke thereof comprising a pivoted lever having a stop portion of said actuating element, a stud pivoted to the lever between said stop portion and the pivot of the lever, a thermal element mounted on said stud and a manually adjustable rod associated with said stud and adapted upon rotation to swing said lever for adjusting purposes and to prevent rotation of the stud, said thermal element being located to act as a stop for said actuating element when in position closer to the actuating element than the stop portion of said lever.

JOHN E. SMITH.